Aug. 5, 1952
H. I. BECKER
2,605,876
MAGNETIC CLUTCH
Filed Oct. 2, 1950
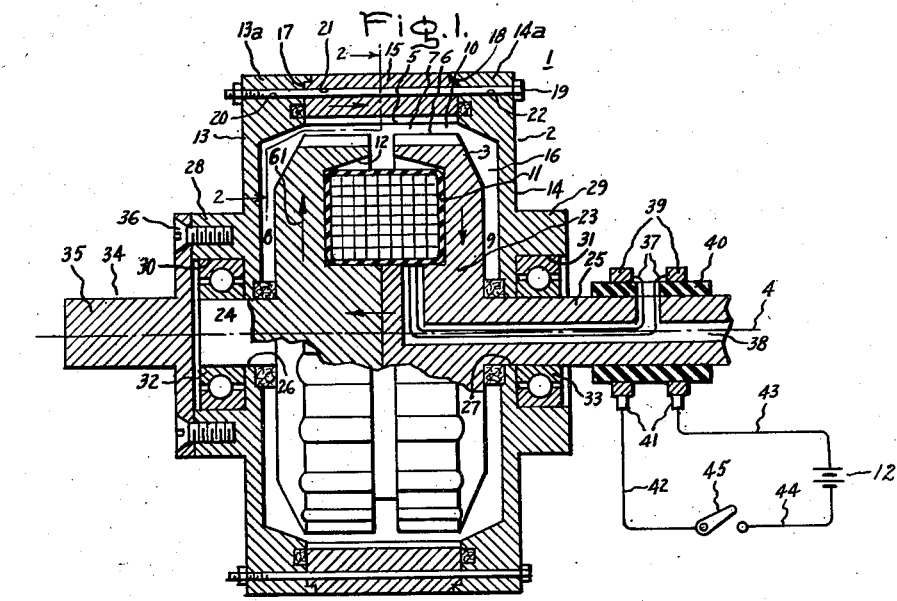
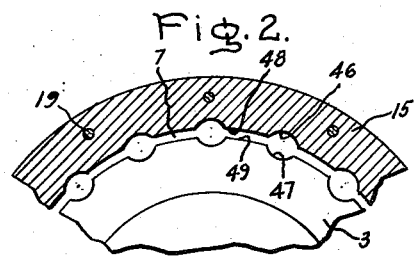
Inventor:
Howard I. Becker,
by Charles A. Mott
His Attorney.

Patented Aug. 5, 1952

2,605,876

UNITED STATES PATENT OFFICE 2,605,876

MAGNETIC CLUTCH

Howard I. Becker, Vischers Ferry, N. Y., assignor to General Electric Company, a corporation of New York Application October 2, 1950, Serial No. 188,009

4 Claims. (Cl. 192—21.5)

1

This invention relates to magnetic clutches and more particularly to magnetic clutches of the type utilizing a magnetic powder and flux producing means to controllably produce friction between relatively rotating spaced bodies.

In magnetic clutches of the type described above, the magnetic powder, as for example powdered iron, is mixed with a lubricant, as for example an oil or graphite, to form a batter or paste which acts as a lubricant when not magnetized and when magnetized produces a high friction or tension between adjacent surfaces bridged by the magnetized particles.

A serious difficulty of the magnetic powder clutch is a tendency of the magnetic powder to pack in the air gap between the spaced bodies due to the centrifugal effect, the inability of the magnetic powder to remain in suspension in the lubricant, and the magnetic effect squeezing the lubricant out of the mixture of magnetic powder and lubricant. The packing effect thereby resulting produces an undesirably high breakaway torque between the spaced bodies when the clutch has been running for several minutes without slippage. Also, if the clutch has not been used for several days the breakaway torque as a result of packing of the magnetic powder is undesirably high.

It is, therefore, an object of this invention to provide a simple, reliable magnetic clutch of the magnetic powder type in which the effect of packing of the magnetic powder is reduced to a minimum.

A further object of this invention is to provide a magnetic clutch of the magnetic powder type in which a more positive lock-in between relatively rotating spaced bodies is obtained.

In general, my invention consists of a magnetic clutch comprising relatively rotatable bodies having spaced adjacent surfaces forming a substantially uniform air gap therebetween, a mixture of magnetic and lubricant material in the air gap, means for magnetizing the magnetic material, and spaced recesses formed in the adjacent surfaces to prevent packing of the magnetic material and to obtain a more positive lock-in between the surfaces.

For a complete understanding of my invention, reference should be had to the following specification and the accompanying drawing in which Fig. 1 is a view partially in cross-section of a magnetic clutch illustrative of my invention, and Fig. 2 is a limited cross-sectional view taken on line 2—2 of Fig. 1.

Referring to Fig. 1 of the drawing, there is shown therein a magnetic clutch 1 illustrative

2 of my invention. The magnetic clutch 1 in general comprises a drive member 2 and a driven member 3 arranged for relative rotation about a common concentric axis indicated at 4 and having respective spaced adjacent cylindrical surfaces 5 and 6 forming an annular air gap 7 of substantialy uniform cross-section. Also, to provide for the transmission of torque between the drive member 2 and the driven member 3, the air gap 7 and additional spaces indicated at 8 and 9 are filled with a mixture 10 of magnetic material such as powdered iron, and a lubricant, such as oil, and a flux producing coil 11 is positioned in an annular recess 12 of the driven member 3 to magnetize the powdered iron of the mixture 8 in the air gap 7 in response to excitation from an electrical source indicated at 12.

Referring to the drawing in detail, in a preferred embodiment of my invention, as shown in Fig. 1, the drive member 2 is formed of two dish-shaped members 13 and 14 having, respectively, inwardly disposed rim portions 13a and 14a bridged by an annular member 15 to form a hollow substantially cylindrical interior 16. The annular member 15 is held in position to bridge the rim portions 13a and 14a by any suitable means as by recessed joints 17 and 18 and a plurality of spaced bolts 19 positioned in aligned spaced apertures 20—22 formed, respectively, in the rim portion 13a, the annular member 15, and the rim portion 14a, as shown in Fig. 1.

The driven member 3 is formed of a substantially cylindrical main body 23 positioned in the hollow interior 16 of the drive member 2 and is recessed as at 12 to accommodate the coil 11.

To provide for relative rotation of the drive member 2 and the driven member 3, the driven member 3 is provided with oppositely projecting shafts 24—25 integral with the main body 23 of the driven member 3 and positioned in aligned apertures 26—27 of the respective dish-shaped members 13—14. The members 13—14 are provided, respectively, with hub shaped portions 28—29 recessed as at 30 and 31 to accommodate, respectively, bearings 32 and 33 which rotatably support the driven member 3.

To provide for rotation of the drive member 2 from a separate drive source (not shown) a drive plate member 34 having an outwardly projecting drive shaft 35 concentric with the axis of rotation 4 is secured to the hub 28 by any suitable means, as for example, by a plurality of spaced screws 36, as shown in Fig. 1.

To energize the coil 11 a pair of conductors 37 are positioned in a passageway 38 formed in the driven member 3, as shown in Fig. 1, and connected to the coil 11 and a pair of slip rings 39. The slip rings 39 are mounted on the shaft 25 by insulator means 40 to rotate in unison therewith and are electrically connected to the source of electric energy 12 through a pair of stationary brush members 41 engaging the slip rings 39 and conductors 42—44 electrically connected to the electric source 12 through a switch means 45.

In operation by energizing the coil 11 a magnetic flux is established in a path indicated by the arrows 61 and the powdered iron of the magnetic material 10 is magnetized to bridge the air gap 7 and provide a high friction or tension between the adjacent surfaces 5—6 of the respective members 2—3. When the coil 11 is de-energized the mixture 10 acts like a grease to permit relative rotation of the members 2—3. If desired, the dish-shaped members 13 and 14 may be made of a nonmagnetic material, such as aluminum or brass, for the purpose of maintaining a maximum flux density in the magnetic path 61.

However, when the adjacent clutch surfaces 5—6 are smooth a serious difficulty is developed from a tendency of the powdered iron of the mixture 10 to pack in the air gap 7. The tendency of the powdered iron to pack is due to several reasons, including a centrifugal effect on the iron, the inability of the iron to stay in suspension, and the magnetic effect squeezing the oil out of the mixture 8. Since satisfactory operation of a magnetic clutch is dependent upon obtaining a maximum torque transmission when the clutch is magnetized and a minimum of torque transmission when not magnetized, packing of the powdered iron resulting in torque transmission independent of magnetic action is undesirable. The undesirable effect of packing of the powdered iron is apparent in one instance when the clutch has been in operation several minutes without slippage. Under this condition, as a result of packing of the powdered iron, the breakaway torque is considerably increased. Again, if the clutch has not been used for several days the breakaway torque is considerably increased as a result of packing of the powdered iron. Also, with certain oils in the mixture 8 the torque transmitted may vary greatly or almost disappear at high temperatures or continue undesirably with reduced excitation of the coil 11 by reason of packing of the powdered iron.

To avoid the undesirable packing effect of the powdered iron as described above, and to obtain a more positive lock-in of the drive member 2 and driven member 3, in accordance with my invention the adjacent surfaces 5—6 are provided respectively with a plurality of spaced grooves 46—47, best seen in Fig. 2, to form adjacent spaced projections 48 in the surface 5 and 49 in the surface 6. The grooves 46—47 provide space in which the powdered iron of the mixture 10 may accumulate to prevent packing thereof between the projections 48—49 and thereby avoid a high breakaway torque. The projections 48—49 provide a means for churning the powdered iron and oil mixture 10 to avoid the tendency of the powdered iron to pack. In addition, the projections 48—49 provide a more positive drive between the members 2—3 by alignment of corresponding teeth when the clutch is fully magnetized.

In the above I have described a preferred embodiment of my invention. It should be noted that, dependent upon the circumstances, it may also be satisfactory to groove only one of the surfaces 5—6 retaining a smooth surface on the other.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. A magnetic clutch comprising a drive member and a driven member arranged for relative rotation about a common concentric axis, adjacent spaced cylindrical clutch surfaces on said drive and driven members providing an air gap therebetween of substantially uniform cross-section, a mixture of magnetic powder and a lubricant in said air gap, means for producing an electric flux in said air gap to magnetize said powder to produce friction between said adjacent surfaces, at least the outer one of said adjacent surfaces being provided with spaced grooves to prevent packing of said powder.

2. A magnetic clutch comprising a drive member and a driven member arranged for relative rotation about a common axis, one of said members having a hollow cylindrical shape with the inner surface comprising a magnetic clutch surface, the other of said members being positioned within said hollow cylindrical member and having an outer cylindrical magnetic clutch surface for magnetic cooperation with said inner surface and forming a substantially uniform magnetic air gap therebetween, the clutch surface of at least the outer one of said members including spaced grooves extending from one end to the other, a mixture of magnetic powder and a lubricant in said air gap, a toroidal excitation winding concentrically positioned within one of said members and arranged for excitation of said clutch to produce a magnetic flux between said clutch surfaces and across said air gap to magnetize said magnetic powder.

3. A magnetic clutch comprising a drive member and a driven member arranged for relative rotation about a common axis, one of said members having a hollow cylindrical shape with the inner surface comprising a magnetic clutch surface having axially aligned angularly spaced grooves, the other of said members being positioned within said hollow cylindrical member and having an outer cylindrical magnetic clutch surface for magnetic cooperation with said inner surface and forming a substantially uniform magnetic air gap therebetween, a mixture of magnetic powder and a lubricant in said air gap, a toroidal excitation winding concentrically positioned within one of said members and arranged for excitation of said clutch to produce a magnetic flux between said clutch surfaces and across said air gap to magnetize said magnetic powder.

4. A magnetic clutch comprising a drive member and a driven member arranged for relative rotation about a common axis, one of said members having a hollow cylindrical shape with the inner surface comprising a magnetic clutch surface, the other of said members being positioned within said hollow cylindrical member and having an outer cylindrical magnetic clutch surface for magnetic cooperation with said inner surface and forming a substantially uniform magnetic air gap therebetween, each of said surfaces including an equal predetermined number of axially aligned spaced grooves, a mixture of magnetic powder and a lubricant in said air gap, a toroidal excitation winding concentrically positioned within one of said members and arranged for excitation of said clutch to produce a magnetic flux between said clutch surfaces and across said air gap to magnetize said magnetic powder.

HOWARD I. BECKER.

REFERENCES CITED

The following references are of record in the file of this patent:

UNITED STATES PATENTS

| Number | Name | Date |
|---|---|---|
| 2,519,449 | Findley | Aug. 22, 1950 |
| 2,525,571 | Winther | Oct. 10, 1950 |
| 2,543,394 | Winther | Feb. 27, 1951 |

OTHER REFERENCES

Supplemental Information Magnetic Flux Clutch—National Bureau of Standards, May 9, 1949.

"Magnetic Fluid Clutch in Servo Applications," Electronics, Nov. 1949, pages 100–103, inclusive.

Technical Report 1213, National Bureau of Standards, Washington, D. C., copy received in Division 68 U. S. P. O. on Mar. 30, 1948.